United States Patent [19]

Meindl

[11] Patent Number: 5,147,023
[45] Date of Patent: Sep. 15, 1992

[54] METHOD AND APPARATUS FOR CONVERTING A MULTI-ROW CONTAINER INTO, A SINGLE ROW STREAM

[75] Inventor: Theodor Meindl, Geiselhöring, Fed. Rep. of Germany

[73] Assignee: Krones AG Hermann Kronseder Maschinenfabrik, Neutraubling, Fed. Rep. of Germany

[21] Appl. No.: 824,727

[22] Filed: Jan. 21, 1992

Related U.S. Application Data

[63] Continuation of Ser. No. 571,133, Aug. 22, 1990, abandoned.

[30] Foreign Application Priority Data

Aug. 24, 1989 [DE] Fed. Rep. of Germany ....... 3928017

[51] Int. Cl.$^5$ .............................................. B65G 47/12
[52] U.S. Cl. .................... 198/454; 198/437; 198/443; 198/448
[58] Field of Search ............... 198/437, 443, 447, 448, 198/454, 453

[56] References Cited

U.S. PATENT DOCUMENTS 2,315,880  4/1943  Stiles .................................. 198/454

FOREIGN PATENT DOCUMENTS

| | | |
|---|---|---|
| 085184 | 3/1985 | European Pat. Off. . |
| 0178028 | 4/1986 | European Pat. Off. ............ 198/454 |
| 175292 | 3/1987 | European Pat. Off. . |
| 2830197 | 1/1980 | Fed. Rep. of Germany ...... 198/454 |
| 3543721 | 6/1987 | Fed. Rep. of Germany ...... 198/454 |

*Primary Examiner*—Joseph E. Valenza
*Assistant Examiner*—Tuan Nguyen
*Attorney, Agent, or Firm*—Fuller, Ryan, Hohenfeldt & Kees

[57] ABSTRACT

Method and installation for converting multi-track flow of containers into a single track flow, wherein an infeed conveyor is slanted relative to the horizontal plane, an intermediate conveyor is slanted at the same angle and so is a discharge conveyor. The intermediate conveyor is at least as wide as the infeed conveyor and abuts onto it. The discharge conveyor is arranged parallel and lateral to the intermediate conveyor. There is a crossover plate between the infeed and intermediate conveyors. The advanced containers are first pushed onto the cross-over plate by the containers coming in on the infeed conveyor and they remain abreast of each other as they are then pushed onto the intermediate conveyor, whereby they are gradually accelerated to a speed which is lower than the speed of the discharge conveyor. The cross-over between the individual belts of the intermediate conveyor, which respectively run at speeds which increase down the slant onto the discharge conveyor, results from the downward force generated by the slant.

14 Claims, 1 Drawing Sheet

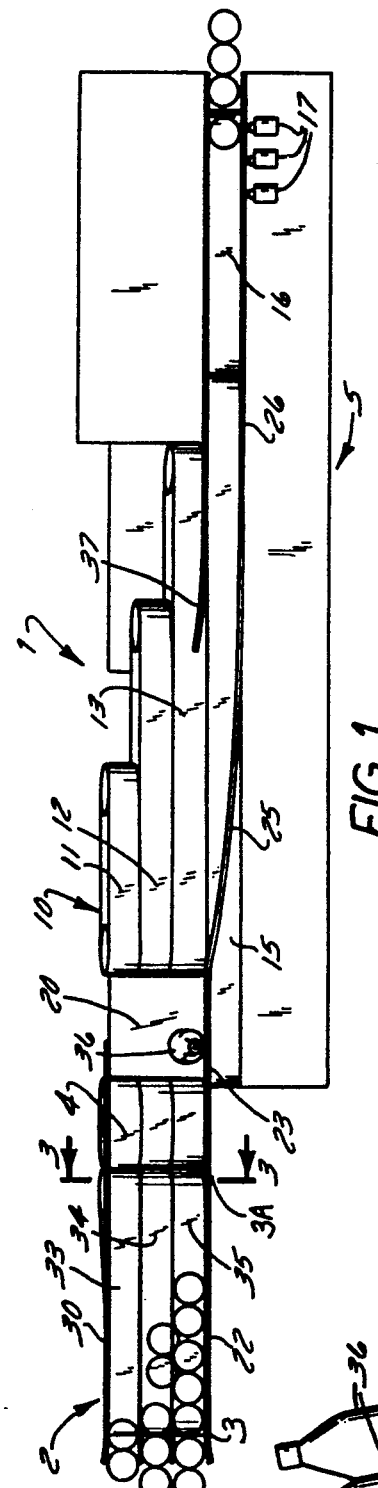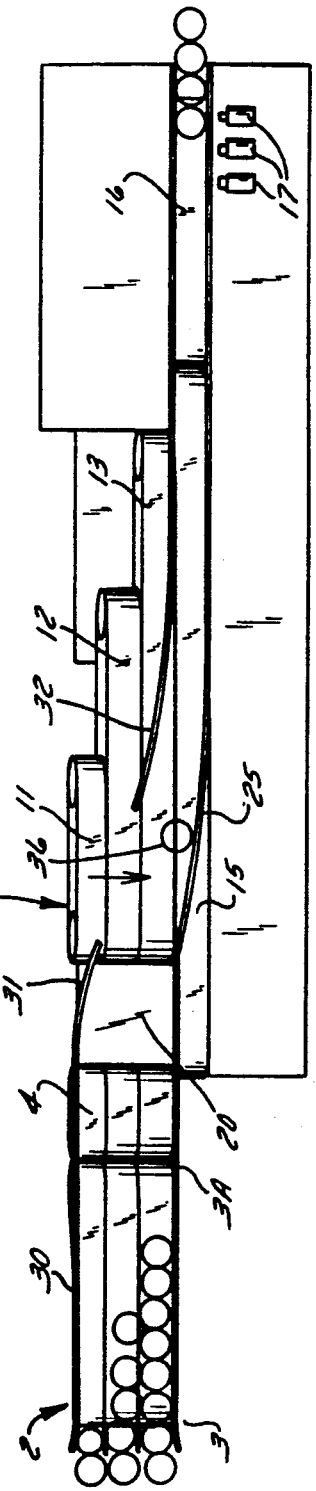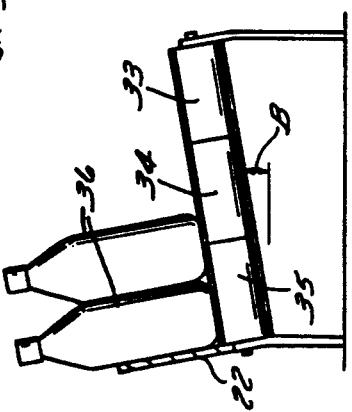

METHOD AND APPARATUS FOR CONVERTING A MULTI-ROW CONTAINER INTO, A SINGLE ROW STREAM

This is a continuation of copending application Ser. No. 07/571,133 filed on Aug. 22, 1990, now abandoned.

BACKGROUND OF THE INVENTION

The present invention relates to an apparatus and method for rearranging a multi-track succession of rows of containers into a single track or single file stream of containers as the containers are conveyed between the infeed and outfeed ends of the conveyor apparatus. In connection with the process of filling containers such as glass bottles, glass jars, cans, plastic bottles and plastic cans with beverages and food stuffs, for example, there are often situations where the flow of three, four or more containers advancing in parallel need to be converted into a single row stream of containers for being fed individually into a processing machine such as a labeling machine. One of the major problems incidental to this process is that there can be a multitude of collisions between the individual bottles or other containers which result in violation of permissible noise levels. Moreover, the impact between glass containers damages them and occasionally breaks them. This results in reducing the productivity of the container handling apparatus.

A method and apparatus for solving the foregoing problems is described in European patent EPO 085 184. This apparatus comprises an infeed conveyor having belts on which bottles are advanced abreast in rows of four. An intermediate conveyor is arranged contiguously with and in parallel with the infeed conveyor and there is a single lane outfeed or discharge conveyor arranged contiguously in parallel with the intermediate conveyor. Thus, rows of bottles coming in on the infeed conveyor can successively move to the intermediate conveyor and then to the discharge conveyor on which they advance in single file. The intermediate conveyor comprises a plurality of parallel adjacent longitudinally moving conveyor belts driven in the direction of the discharge conveyor in a staggered manner and at high speed. The intermediate conveyor, the infeed conveyor at its terminal area located next to the intermediate conveyor and the discharge conveyor are similarly sloped or slanted transversely to the longitudinal direction at an angle relative to a horizontal plane that induces the bottles to slide over the adjacent conveyor sections as a result of a horizontal force component of gravity. A rail of the infeed conveyor located on the lower side of the slanted conveyor converts into a guide surface in the area around the intermediate conveyor, the guide surface being designed as a supporting surface for the bottles on the lower surface, and discharges to a rail of the discharge conveyor located on the lower side of the slope. The slant of the intermediate conveyor, the infeed conveyor and discharge conveyor in the required area is at an angle of approximately 10° to 12°. As a result of the mutual support between bottles, they are gently and safely accelerated while undergoing lateral transfer on the conveyors under the influence of the gravitational force. The belts of the intermediate conveyor run at increasingly higher speeds as they progress from the infeed conveyor to the discharge conveyor. The apparatus is widely used in bottle filling operations and permits processing up to 110,000 bottles per hour with little bottle wear and an acceptable noise level.

Regardless of the merits of the patented row-to-single file converting apparatus, the high productivity of the apparatus is disadvantageous when used in conjunction with lower capacity container filling equipment such as where a processing capacity of only up to about 20,000 bottles or containers per hour is required. For low capacity systems, the space required for the patented system and the expense in constructing it is considered to be too great. It has, therefore, not been possible previously to benefit from the low noise level and minimal wear and minimal glass breakage features to installations having lower capacities.

European patent EP-B-O 175,292 shows apparatus for converting a multi-row container stream into a single row stream for relatively low rate container handling systems. In this apparatus, the intermediate conveyor and the discharge conveyor are arranged in parallel with each other, and abut entirely and directly on the infeed conveyor. The infeed conveyor, the intermediate conveyor and the discharge conveyor are slanted transversely at an angle of 11°. A rail arranged on the lower side of the slanted infeed conveyor continues in a straight line into the discharge conveyor. The transfer of bottles from the infeed conveyor to the intermediate conveyor and to the discharge conveyor takes place by means of slide plates onto which the containers, such as bottles, are pushed by the infeed container. The bottles are then pushed over the slide plate by the bottles that follow and are taken up by the intermediate conveyor and discharge conveyor in sequence.

The apparatus just discussed has some fundamental defects. If, for example, four rows of bottles arranged in parallel approach the infeed conveyor at a speed of $V_{in}$, then the discharge conveyor must exhibit a speed of $V_{out}$, which is four times as great as the infeed conveyor speed in order to handle the quantity of containers. If, as is suggested in the cited European patent, the belts of the infeed conveyor and the intermediate conveyor operate at the same speed, the bottles which are pushed from the slide plate at essentially $V_0$ onto the corresponding transport belt of the intermediate conveyor or the discharge conveyor are accelerated at four times the speed. The path available for the acceleration during this forward push from the slide plate onto the corresponding conveyor belt is, however, relatively short so that acceleration rates are very high at the transfer point. Since the center of gravity of bottles is above the point of contact, which provides the accelerating frictional force, the bottles tip over during an acceleration in the direction toward the infeed conveyor. This tipping action brings about collisions with the bottles that follow so that a very high level of noise develops and there is an increased risk of glass breakage. Furthermore, there is a risk that the bottles will fall off the belt as a result of the tipping movement so productivity is impaired and waste is increased. Even if, as is described in an alternative embodiment suggested in European patent EP-B-O 175,292 the belts of the intermediate conveyor operate at different speeds, these disadvantages are only partially nullified. Thus, the apparatus described in the European patent under discussion has not gained wide acceptance by the industry.

SUMMARY OF THE INVENTION

The objective achieved by the present invention is to provide a method by which it is possible to arrange containers, especially glass bottles, which are advancing abreast of each other in multiple lanes into containers which are advancing in a single lane with minimal wear on the containers and at low noise levels, with insignificant, if any, breakage and with a high degree of operational reliability. Moreover, the present invention provides apparatus for carrying out the method, which has small floor space requirements and which is economical to produce.

According to the invention, the bottles are accelerated by transport belts that operate at varying speeds. The adjacent belts of the infeed conveyor and the intermediate conveyor are all slanted or sloped at the same angle transversely to their longitudinal direction of movement so the bottles being transported on the high side of the conveyors are shoved downward by a gravitational component of force. Since the speed of the transport belts on the lower side of the slant is higher than those on the upper side of the slanted arrangement, and the infeed conveyor abuts the intermediate conveyor, large gaps between bottles occur on the lower transport belts as a result of the acceleration of the bottles during the cross-over from the cross-over plate onto the intermediate conveyor, into which the bottles transported on the upper transport belts glide gently and with little noise. Since the speed of all belts of the intermediate conveyor are different but slower than the speed of the discharge conveyor, the acceleration of the bottles during their transfer from the cross-over plate is limited, so the tipping action during the acceleration of the bottles and the danger of bottles falling over as a result of this acceleration is considerably decreased.

The slant of the infeed, the intermediate and the discharge conveyors is preferably 10° to 12° as is generally known in the art.

A further feature of the invention is that the speed ratios of the intermediate conveyor belts are such that the speed of the transport belt that is located on the high side of the conveyor is greater than the speed of the infeed conveyor. This design permits bottle accelerations to be apportioned among the individual tracks and the gradual acceleration of the bottles sliding down from the upper bottles to the lower bottle rows is simplified.

In addition to the mentioned functional advantages of the method, an important advantage is that a significantly smaller area is required to accommodate the apparatus for carrying out than is required in the design shown in European patent EP-B-0 085,184. In this patent the intermediate conveyor is not arranged in parallel with the infeed conveyor, but instead abuts the infeed conveyor. The floor space required for this apparatus is unduly large.

Another important feature of the present invention is that the discharge conveyor is arranged in parallel with the intermediate conveyor and the discharge conveyor has a length that extends along the entire length of the intermediate conveyor. This construction is advantageous in that it provides a gradual transition at low acceleration from the lowermost slanted belt of the intermediate conveyor onto the discharge conveyor. This construction also leads to a further decrease in the space required for the apparatus.

In another embodiment of the invention, the width of the infeed conveyor is the same as the width of the intermediate conveyor. This also results in a reduction in the space required and in the manufacturing cost of the apparatus.

Another feature of the invention is that the transport belts of the intermediate conveyor have different lengths, whereby the lowermost transport belt is the longest and the upper transport belt up the slant is the shortest. This construction utilizes the effect that the transfer of the containers from the upper transport belts takes place faster than on the lowest transport belt of the intermediate conveyor. This construction results in a further reduction in the space required and also there is a considerable decrease in the construction and material expenditure.

According to a further embodiment of the invention, a rail is provided in the area of the cross-over plate on the upper transport belt of the intermediate conveyor which extends in a gradual curve over this transport belt. This rail provides the advantage that the cross-over of the bottles from the upper side to the lower side of the intermediate conveyor is accelerated and the downward force is supported.

According to a further development of the invention, such a gradually curving rail is also provided in the lower downhill area of the intermediate conveyor. This rail essentially closes off the lower transport belt of the intermediate conveyor and makes an asymptotic transition into the upper rail of the discharge conveyor.

Both rails have the advantage that the conveyors are supported while sliding down hill from the upper side to the lower side of the intermediate conveyor. Furthermore, this avoids the need for a safety area within the intermediate conveyor and allows a short intermediate conveyor. The space requirement and the expense for construction is thereby lowered even more.

The apparatus and method, according to the invention, are suited for rearranging multiple rows of containers into single file. For the sake of illustration, the term "bottles" will be used hereinafter as a generic term for containers since the apparatus and method are most beneficial to bottle handling installations.

How the foregoing and other features of the invention are achieved will appear in the more detailed description of the invention which will now be set forth in reference to the drawing.

DESCRIPTION OF THE DRAWING

FIG. 1 is a plan view of one embodiment of the invention;

FIG. 2 is another embodiment of the invention; and

FIG. 3 is a sectional view taken on a line corresponding with 3—3 in FIG. 1.

DESCRIPTION OF A PREFERRED EMBODIMENT

Attention is invited to the FIG. 1 embodiment which is intended for specifically handling glass bottles although no alteration would be needed for using it to handle glass jars, plastic containers, and so forth.

In the FIG. 1 embodiment, the apparatus 1 is comprised of an infeed conveyor 2 on which the bottles are advanced in three tracks or lanes in this particular design. Infeed conveyor 2 comprises a conveyor belt on which bottles 36 stand upright as they advance to the right as depicted in FIG. 1. The infeed conveyor 2 acquires a twist between the lines marked 3 and 3A. The twist is such that at the end of the area 3A the conveyor slants at an angle of 10° to 12° but preferably 11° relative to the horizontal plane. The angle of the slant is marked B in FIG. 3. In this figure one may see that lane 33 is at the highest elevation of the three lanes 33, 34 and 35.

The infeed conveyor belt 2 then continues at this angle in the area 4.

The intermediate conveyor 10 is comprised of three individual bottle transport belts 11, 12 and 13 whereby the containers 36 are transported upright on the belts of the intermediate conveyor. Conveyor belts 11, 12 and 13 run at different speeds. Conveyor belt 13 is the fastest of the three. Belt 12 is a little slower than belt 13 and belt 11 is a little slower than belt 12. Even the slowest belt 11 in the intermediate conveyor 10 runs faster than the infeed belt 2. Belts 11, 12 and 13 have the same slant or decline as the infeed conveyor has in the area of line 3A.

There is a planar surface in the form of a cross-over plate 20 arranged between the infeed conveyor 2 and intermediate conveyor 10 onto which the approaching bottles 36 are pushed by the infeed conveyor 2. The bottles maintain their track positions as they go onto plate 20 and as they begin their journey on the intermediate conveyor belts 11–13. The infeed conveyor 2 has a lower guide rail 22 which continues in the form of a straight rail or bottle guide plate 23 in the front region of the cross-over plate 20. There is a gradually curving rail 25 arranged in continuity with support or guide plate 23. Curved rail 25 extends across the discharge conveyor 15 and serves as the lower side rail 26 of the discharge conveyor. There is a guide rail 30 on the high side of slanted infeed conveyor 2. Rail 30 extends to along part of transfer surface or plate 20. The width of the intermediate conveyor 10 is not less than or greater than the width of the infeed conveyor 2.

The speed ratios of the apparatus are as follows. Initially, infeed conveyor 2 advances N rows of containers arranged in parallel at a speed of $V_{in}$. The speed of the discharge conveyor belt 15 $V_{out}$, is then $N \times V_{in}$. If in the intermediate conveyor 10 the belt 11 on the highest side of the slanted belts is assigned a velocity $V_1$, the center belt 12 is assigned a velocity $V_2$ and the third belt 13, the lowest side belt, is assigned a velocity of $V_m$ then, according to the invention, a speed distribution of the following results:

$V_{in} < V_1 < V_2 \ldots < V_m$ and $< V_{out}$.

If, as is the case in the FIG. 1 illustrated embodiment, three rows of containers 36 are advanced and there are three transport belts 11, 12 and 13 in the intermediate conveyor, then $V_{out}$ = at least $3 \times V_{in}$ and $V_{in} < V_1 < V_2 < V_3 < V_{out}$ is valid.

The design and speed distribution for a system that handles three infeed bottle rows functions in the following way.

The horizontal rows of bottles approaching an infeed conveyor 2 are slanted 11° with respect to the horizontal plane by the time the bottles reach the area 3A and move onto the cross-over plate 20 which is also slanted at the same angle relative to the horizontal plane. The rails 22 and 23 prevent the bottles from sliding off in this area. Because of the slant of the infeed belt conveyor 2, all of the bottles lie against each other, so accidental collisions between bottles are avoided during movement. The bottles are pushed by the force of the bottles on the infeed conveyor onto the cross-over plate 20 and are further advanced to the intermediate conveyor by bottles which follow at the speed of $V_{in}$. The individual bottles then reach the intermediate conveyor 10 where the bottles are accelerated from belt to belt. Since the belts 11, 12 and 13 run at higher speeds, in that order, than the infeed conveyor 2 speed, the bottles are accelerated to a higher speed successively so that the spacing increases between bottles in the lowermost lane relative to the next adjacent higher lane. Since the speed of belt 13 is greater than the speed of belt 12 which is, in turn, greater than the speed of belt 11, the spacing between the bottles on belt 13 is greater than the bottles on belt 12 and this in turn is greater than the spacing between the bottles on belt 11. The bottles on belt 13 slide onto conveyor belt 15 as a result of the downward component of gravitational force where they are accelerated to the discharge speed $V_{out}$. The acceleration to the highest speed thus takes place in the area between the lower and fastest intermediate conveyor belt 13 and the discharge conveyor belt 15. Thus, the differences in the speed at the cross-over plate 20 can be maintained at lower values and the risk of the bottles tipping is diminished. There is an additional guide rail 37 which can be of some benefit.

When the bottles are being conveyed on the discharge conveyor belt 15 they are still at an angle off of vertical since the belt 15 is angulated in a common plane with the upper surfaces of the intermediate conveyor belts 11, 12 and 13. After the bottles reach the area 26 at the end of discharge conveyor 15, the bottles move onto a conveyor 16 which has a counter twist relative to the slanted conveyor belt 15 such that conveyor belt 16 lies in a horizontal plane and the bottles stand perfectly vertical again. In the illustrated embodiment of FIG. 1, there are a group of photosensors 17 arranged adjacent conveyor belt 16. These photosensors detect and register the number of approaching individual bottles and provide information as to the spacing between them for the purpose of regulating the speed of the belts as a function of these values by using a programmable microprocessor based controller, not shown.

The FIG. 2 embodiment corresponds in most respects with the FIG. 1 embodiment. In contrast to the FIG. 1 embodiment, however, there is a curved support rail 31 which is an extension of the straight portion of the guide rail 30. The rail portion 31 curves across the first intermediate conveyor 11 in a gradual curve. There is also a second support rail 32 which extends in a curve across the lowermost intermediate conveyor belt 13. The support rails provide a counter force to the downward force and assure that no bottles are advanced beyond the corresponding positions in the area of the intermediate conveyor. By providing this rail, it is possible to shorten the intermediate conveyor area even more to thereby further decrease the floor space required for the apparatus.

I claim:

1. A method of rearranging containers which are advancing abreast of each other in successive rows into a series of containers advancing in single file formation comprising the steps of:

feeding said rows of containers successively onto an infeed conveyor having a predetermined width and is slanted at an angle relative to a horizontal plane transversely to the longitudinal direction in which said infeed conveyor is moving, having following successive rows of containers push leading rows of containers onto and off of a planar surface which is slanted at an angle corresponding to the angle of the infeed conveyor with the containers substantially maintaining their track positions abreast of each other as they pass over said planar surface, receiving said rows of containers as they are pushed off the slanted planar surface with their track positions maintained on an intermediate conveyor having a width corresponding to said width of the infeed conveyor and is comprised of longitudinally running adjacent belts which are slanted in succession transversely to the direction in which the belts run at an angle in respect to the horizontal plane corresponding to the slant of said infeed conveyor and said planar surface, having the highest belt among the slanted belts of the intermediate conveyor run at a predetermined longitudinal speed and having the slanted succession of adjacent belts run at increasing speeds progressing away from said highest belt to the lowest belt, arranging a container discharge conveyor closely adjacent and parallel to the lowest belt in the intermediate conveyor and lower than any container in the lowest track position in the row of containers being pushed off the slanted planar surface such that any container coming off the slanted planar surface must travel onto at least one belt of the intermediate conveyor to undergo a downward component of force imparted by the slant of the intermediate conveyor before the container arrives on the discharge conveyor, and providing for at least some of said containers which are in track positions aligned with the lowermost belt of the intermediate and infeed conveyors to begin moving onto said discharge conveyor immediately after said containers are pushed off the planer surface and temporarily conveyed by the lowermost belt of the intermediate conveyors.

2. The method according to claim 1 wherein said predetermined longitudinal speed of said highest belt up the slant is running the slowest of the other belts among the belts of said intermediate conveyor but is running faster than said infeed conveyor.

3. The method according to claim 1 wherein said discharge conveyor is running faster than said adjacent lowest belt of said intermediate conveyor.

4. The method according to claim 1 wherein the highest side of the slanted infeed conveyor and the highest side of the intermediate conveyor are in straight alignment.

5. The method according to any one of claims 2, 3 or 4 wherein said slant is at 10° to 12° relative to horizontal.

6. Apparatus for rearranging containers, which are advancing abreast of each other in successive rows, into a series of containers advancing in single file formation, comprising:

an infeed conveyor having a predetermined width for conveying said containers abreast and in rows in a longitudinal direction, said infeed conveyor being slanted transversely of said longitudinal direction at an angle relative to a horizontal plane such that said infeed conveyor has a longitudinally extending highest boundary and a longitudinally extending lowest boundary, a planar surface onto which containers in leading rows are pushed by containers in following rows which are being advanced by said infeed conveyor and from which planar surface said rows of containers are pushed off by advancing rows, said planar surface having a leading edge abutting said infeed conveyor and being slanted correspondingly to said infeed conveyor and having a trailing edge, an intermediate conveyor longitudinally aligned with said infeed conveyor having a width corresponding to said width of the infeed conveyor arranged in abutting relation to said trailing edge of said planar surface and together slanted at an angle corresponding to the angle of said planar surface for said intermediate conveyor to receive the rows of containers pushed from said planar surface, said intermediate conveyor including a plurality of parallel longitudinally translating belts the highest one of which among the slanted belts has a longitudinally extending highest boundary in straight alignment with said highest boundary of said infeed conveyor and the lowest one of which has a longitudinally extending lowest boundary in straight alignment with the lowest boundary of the infeed conveyor, the slant of said belts in said intermediate conveyor resulting in development of a component of force which causes said containers to slide transversely away from the highest of said belts in the intermediate conveyor, guide rail members arranged along the lowest side of the slanted infeed conveyor and the lowest side of said planar surface to prevent fall off of containers before they arrive on said intermediate conveyor, a discharge conveyor arranged for running in the same direction and closely adjacent the lowest boundary of said intermediate conveyor for receiving containers which slide transversely of the belts of said intermediate conveyor, and a guide rail means extending in a curved configuration from said trailing edge at the lowest side of the slanted planar surface over the discharge conveyor to provide for some of the containers beginning to slide onto said discharge conveyor from said intermediate conveyor immediately after said containers are pushed off said planar surface and temporarily conveyed by the lowermost belt of the intermediate conveyors, and then extend along the discharge conveyor to hold containers thereon.

7. The apparatus according to claim 6 wherein the highest belt among the slanted belts of the intermediate conveyor translate at a higher speed than the speed at which the infeed conveyor translates.

8. The apparatus according to claim 7 wherein the highest belt of said belts of the intermediate conveyor runs at a predetermined speed, the speeds of the respective belts increase in succession from the highest to the lowest belt and the speed of the discharge conveyor is greater than the speed of said lowest belt.

9. The apparatus according to claim 6 wherein the highest of the slanted conveyor belts of the intermediate conveyor is substantially shorter than the lowest of the belts.

10. The apparatus according to claim 9 wherein said discharge conveyor ends beyond the longitudinal position at which the lowest of the belts of the intermediate conveyor ends.

11. The apparatus according to any one of claims 6, 7, 8, 9, or 10 wherein the highest belt of the intermediate conveyor has a predetermined length and successively lower belts have successively longer lengths.

12. The apparatus according to claim 6 wherein the slant of the infeed, intermediate and discharge conveyors is between 10° and 12°.

13. The apparatus according to ant one of claims 6, 7, 8, 9, 10 or 12 wherein there is a straight guide rail portion extending along the highest boundary of the slanted infeed conveyor and another portion which is curved and extends over the highest part of said slanted planar surface.

14. The apparatus according to any one of claims 6, 7, 8, 9, 10, or 12 wherein there is a rail which curves across at least the lowest belt 13 of the intermediate conveyor and becomes asymptotic to said discharge conveyor.

* * * * *

UNITED STATES PATENT AND TRADEMARK OFFICE
CERTIFICATE OF CORRECTION

PATENT NO. : 5,147,023

DATED : September 15, 1992

INVENTOR(S) : Theodor Meindl

It is certified that error appears in the above-indentified patent and that said Letters Patent is hereby corrected as shown below:

Column 7, line 46: after "claims" and before "2" insert --1, --.

Column 8, line 43: delete "translate" and substitute --translates --.

Column 8, line 66: delete "ant" and substitute --any --.

Signed and Sealed this

Twenty-eighth Day of December, 1993

Attest:

BRUCE LEHMAN

Attesting Officer

Commissioner of Patents and Trademarks